United States Patent Office 3,475,496
Patented Oct. 28, 1969

3,475,496
PROCESS FOR PREPARING BR₃-TYPE ORGANOBORON COMPOUNDS
Franco Smai, Novate Milanese, Milan, and Antonio Salvemini, Molfetta, Bari, Italy, assignors to Montecatini Edison S.p.A., Milan, Italy, a corporation of Italy
No Drawing. Filed Feb. 16, 1966, Ser. No. 527,762
Claims priority, application Italy, Feb. 22, 1965, 3,607/65
The portion of the term of the patent subsequent to Aug. 13, 1985, has been disclaimed
Int. Cl. C07f 5/02; B01j 11/00
U.S. Cl. 260—606.5                 8 Claims

ABSTRACT OF THE DISCLOSURE

A process for producing triorganoboron compounds with the formula $BR_3$ (R representing an alkyl, aryl, alkyl aryl or cycloalkyl radical) wherein an organo halide RX (R having the previously mentioned meaning and X being chlorine, bromine or iodine) is reacted with a boron halide, an alkyl borate or the reaction product of boric oxides and boron halides or alkyl borates. The reaction is carried out at a temperature of 80° C. to 180° C. in a hydrocarbon reaction medium in which magnesium and catalytic amounts of an ether are dispersed. The said triorganoboron compounds are useful as catalyst components for polymerization systems in organic synthesis.

---

Our present invention relates to a process for the preparation of organoboron compounds containing direct carbon-boron bonds and usually having the general formula $BR_3$, where R represents an alkyl, aryl, cycloalkyl or alkylaryl hydrocarbon group or radical; such compounds may be designated hereinafter as triorganoborons or triorganoborines in conformity with conventional nomenclature and are suitable for use as catalyst components for polymerization systems, in organic synthesis etc.

In our copending application Ser. No. 422,027, filed Dec. 29, 1964 (now U.S. Patent No. 3,397,241 issued Aug. 13, 1968), we describe and claim a method of producing triorganoboron compounds having the structural formula given above by the reaction of a Grignard reagent of the general formula RMgX with boron-containing compounds of elements commonly considered to be exchangeable, in a Grignard-substitution reaction, for the organo group of the Grignard reagent. While earlier systems have made use of boron-containing compounds of the general formula $BX_3$, where X represents a halogen (such as chlorine or fluorine), the system set forth in the aforementioned copending application employs boron derivatives of the boric oxide type. In accordance with this development, boron oxide or anhydride is used as the boron-containing substance in a Grignard reaction with the Grignard reagent (RMgX, where R is an alkyl, aryl, cycloalkyl or aralkyl radical and X is a halogen, such as chlorine, bromine or iodine) in the presence of a quantity of borontrifluoride or an organic ester of boric acid. It was thus found that, while boric oxide alone does not react with a Grignard reagent to any material extent, it is capable of conversion to triorganoborines in the presence of such a Grignard when accompanied by boron trifluoride or an organoester of boric acid. Organoesters of boric acid can be considered to have the general formula $B(-OR)_3$, where R is an alkyl group, and such compounds may be referred to hereinafter as alkyl borates.

In general, existing proposals for the reaction of boron-containing substances with a Grignard reagent such that a substitution of the organo radical of the Grignard for the three groups attached to the boron atom is effected, require the prior preparation of the Grignard reagent with the desired organic radical. Thereafter, the Grignard reagent is reacted with boron trichloride, boron trifluoride, and, as we have noted in the earlier application (now Patent No. 3,397,240), alkyl borates or reaction products of the latter with boric oxide ($B_2O_3$). Such systems are, however, characterized by some significant disadvantages. For one thing, the Grignard reagent RMgX decomposes in the presence of moisture and thus care must be taken in its preparation to exclude moisture and, even after the formation of the Grignard reagent considerable efforts are required to maintain it out of contact with moisture or water-containing substances. Furthermore, the reaction time required for preparation of the Grignard reagent is relatively long so that a system which necessitates such prior preparation and its subsequent reaction with the boron compounds is prolonged by a corresponding extent. Additionally, the preparation of the Grignard reagent requires large quantities of ether, as is well known to those commonly working with Grignard reactions, and such ether must be totally free from moisture. In the absence of the large quantity of ether, the Grignard-forming reaction does not appear to occur to any noticeable extent. Because of the high inflammability of ether, its volatility and the requirement that it be absolutely free from moisture, the steps required prior to the actual reaction of the Grignard reagent with the boron compounds were not only time-consuming but also difficult to control and dangerous.

It is an important object of the present invention, therefore, to provide a process for preparing organoboron compounds with direct boron-carbon bonds and, preferably, triorganoborines, which process is free from the aforementioned disadvantages and which can be carried out with relative safety and ease.

A further object of this invention is to provide a process for the production of $BR_3$ compounds from boron trihalide, alkyl borate and combinations of these products with boric oxide which has an overall reaction time substantially less than that required heretofore and which can be carried out economically.

These objects and others which will become apparent hereinafter are attained, in accordance with the present invention, by a process based upon our discovery that boron-containing materials, such as the boron trihalides, alkyl borates and boron derivatives thereof and of boric oxide can be reacted in a manner akin to the reaction of such compounds with a Grignard reagent without, however, preformation of the Grignard, apparently as a consequence of the concurrent or simultaneous formation of a Grignard reagent and its reaction with the boron derivatives to produce directly the trialkyl boron. We have especially observed that it is possible, in accordance with the principles of this invention, to eliminate the need for large quantities of absolute ether and the explosive dangers accompanying same and to eliminate also the disadvantages involved in the separate preparation and storage of a Grignard reagent.

More specifically, we have discovered that it is possible to react an alkyl derivative having the general formula RX, where R is an alkyl, an aryl, a cycloalkyl or an alkylaryl group and X is halogen with a suspension of magnesium metal in an organic hydrocarbon solvent with a boron derivative in the presence of, at most, catalytic quantities of ether. The reaction is carried out at a temperature preferably ranging between 80° and 180° C. and preferably between 100° C. and 150° C. The RX compound is most advantageously an alkyl, aryl or cycloalkyl halide having 2 to 6 and even 7 carbon atoms in the carbon chain. Thus, halogenated catenary (ethyl, propyl, butyl, pentyl and hexyl) halides with straight configurations or with branched chains, cyclohexyl halides and aromatic halides (halobenzenes) yield the best results. Of the halogenated aryl compounds, the most suitable have been found to be chlorobenzenes and bromobenzenes. Suitable reactants also include benzylbromide and benzylchloride, cyclohexylchloride and the like. In general, however, the halide group of the RX-type compounds should be chlorine, bromine or iodine. The boron derivatives which can be employed for the purposes of the present invention, have been broadly designated above and may thus be selected from the group of preferred boron compounds consisting of boron trichloride, boron trifluoride, boron-trifluoride adducts with organic compounds containing a highly electronegative atom [e.g.

$$BF_3 \cdot O(C_2H_5)_2]$$

alkyl borates [e.g. methyl borate: $B(-OCH_3)_3$, and ethyl borate: $B(-OC_2H_5)_3$], and reaction products of boron oxide ($B_2O_3$) and boron halides or organoesters of boric acids.

Advantageously, the suspension of magnesium metal is prepared by the simple addition of comminuted metallic magnesium to an inert solvent in the presence of the aforementioned catalytic quantities of ether, the suspension being preferably activated by addition of small amounts of ethyl iodide prior to reaction of the boron derivative and the RX-type compound with the suspension. As noted, the catalytic quantity of ether, usually diethyl or di-normalbutyl ethers, is significantly less that that normally required to produce the corresponding Grignard reagent and can be a mere trace; such relatively insignificant quantities being sufficient to promote the formation of trialkylborines even with industrial yields. The molar ratio of the ether to the organohalide (RX compound) ranges between substantially 0.01 and 0.5. The molar ratio of the boron derivative and the organohalide can vary within a considerable range and, in practice, the extent of reaction will be found to be limited by the molar quantity of these compounds present in the reaction medium. The quantity of magnesium should be in excess of that required for complete reaction of the organohalide.

According to a further feature of this invention, metallic magnesium chips are suspended in the hydrocarbon solvent, which can be substantially any alkyl, aryl, cycloalkyl or alkylaryl compound, preferably with a carbon number between about 6 and 14, together with the catalytic quantity of ether, this medium being heated to a temperature of 80 to 100° C. After such heating, the RX-type organohalide and the boron derivative are added to the flask and the temperature of the mixture is maintained between 100 and 180° C. by controlling the rate of addition of these reactants. The triorganoborine is separated from the reaction mixture by distillation. Excellent results were obtained when diethylbenzene was employed as the solvent. The methyl benzenes, cyclohexanes and benzenes all formed suitable solvents; in general, it is important that the solvent have a boiling point at the temperature at which the reaction is effected and the choice of a proper solvent will depend upon the reaction temperature. When reaction temperatures of upwards of 150° C. are employed, diethylbenzene forms the most practical solvent whereas, when the reaction is carried out at temperatures below 135° C., one or more of the xylenes may be used.

The invention will be described in greater detail hereinafter with reference to specific examples illustrating the best mode known to us for taking advantage of the present invention.

EXAMPLE I 18 g. of metallic magnesium in the form of chips (0.75 mole), 2.8 g. of ethyl ether (0.037 mole), 1 ml. of ethyl iodide to facilitate the attack on the magnesium and, finally 200 ml. of diethylbenzene were placed in a 500 ml. flask, provided with a stirrer, thermometer, reflux condenser and dropping funnel.

The mixture, under stirring, was heated to a temperature of 80° to 100° C. and a mixture of 26 g. (0.25 mole) of methylborate and 81.8 g. of ethylbromide (0.75 mole) was added dropwise to the reaction medium in the flask.

The addition of the reactants was carried out taking care to keep the reaction temperature between 100 and 110° C.

The exothermic reaction results in the dissolution of magnesium and in the formation of triethyl boron ($B(C_2H_5)_3$) that was then separated by distillation from the reaction mixture. Triethylboron was obtained with a yield of 65% based on the initial quantity of the boron derivative $B(OCH_3)_3$.

EXAMPLES II–VI

The steps of Example I were repeated using the same amounts of magnesium, ethyl-iodide and diethylbenzene but, in this case, various amounts of ethyl ether and different types of boric esters and alkyl halides were used as indicated in Table 1.

The reaction was carried out at a temperature of 100–110° C. The results obtained under these conditions are also listed in the following table:

TABLE 1

| Example | II | III | IV | V | VI |
|---|---|---|---|---|---|
| Boric ester: | | | | | |
| Type | $B(OCH_3)_3$ | $B(OCH_3)_3$ | $B(OCH_3)_3$ | $B(OC_2H_5)_3$ | $B(OCH_3)_3$ |
| Quantity (g.) | 26 | 26 | 26 | 36.5 | 26 |
| Moles | 0.25 | 0.25 | 0.25 | 0.25 | 0.25 |
| Ethyl ether: | | | | | |
| Quantity (g.) | 2.8 | 5.6 | 5.6 | 11.2 | 11.2 |
| Moles | 0.037 | 0.075 | 0.075 | 0.15 | 0.15 |
| Alkyl halide: | | | | | |
| Type | $C_2H_5Cl$ | $C_2H_5Cl$ | $C_2H_5Br$ | $C_2H_5Br$ | $C_2H_5Br$ |
| Quantity (g.) | 48.5 | 48.5 | 81.8 | 81.8 | 81.8 |
| Moles | 0.75 | 0.75 | 0.75 | 0.75 | 0.75 |
| Percent yield as $BR_3$ | 52 | 58 | 80 | 36 | 32 |

From a comparison of Example II with Example III and of Example IV with Example VI it can be seen how the reduction by half of the already small amount of ether does not lead to a substantial lowering of the final yield of $BR_3$; the yield, on the contrary, appears to be influenced more by the varying of other factors such as the nature of the alkyl halide (cf. Examples III and IV) and the type of boric ester (cf. Examples V and VI).

EXAMPLE VII

The reaction was carried out in a 500 ml. flask provided with a stirrer, thermometer, reflux condenser and with two dropping funnels one of which is provided with a jacket for circulation of hot water therearound. 18 g. of metallic magnesium in chips (0.75 moles), 5.6 g. of ethyl ether (0.075 mole), 1 ml. of ethyl iodide for facilitating attack on magnesium, and finally 125 ml. of diethylbenzene were placed in this flask.

The mixture, under stirring, was heated to a temperature of 80°–100° C. Then 81.8 g. [0.75 mole] of ethylbromide from one dropper and a solution of 5.8 g. of $B_2O_3$ [0.0835 mole] and 8.65 g. of $B(OCH_3)_3$ [0.0835 mole] in diethylbenzene from the other dropper were simultaneously and slowly added.

The solution in diethylbenzene was kept at 70°–80° C. by the circulation of hot water in the jacket of this other dropper. Both the reactants ($C_2H_5Br$ and the mixture of $B(OCH_3)_3$ with $B_2O_3$) were added to the magnesium suspension over a period of three hours.

At the close of this addition of the reactants, the reaction mixture was heated at 100–110° C. for about 30 minutes. The resulting triethylboron was separated by distillation from the reaction mixture, collecting the fraction boiling between 94 and 95° C. Triethylboron was thus obtained with a yield of 75% based on the total starting boron both as $B(OCH_3)_3$ and as $B_2O_3$.

EXAMPLES VIII–XII

Reactions were carried out using the same quantities of magnesium, ethyl iodide and diethylbenzene, and working at the same reaction temperature as in the preceding example. However, on various amounts of and different types of boric esters, various quantities of $B_2O_3$, and varying amounts of different types of alkyl halides were used as indicated in the following Table 2 which also lists the results obtained under these conditions:

TABLE 2

| Example | VIII | IX | X | XI | XII |
|---|---|---|---|---|---|
| Boric ester | | | | | |
| Type | $B(OCH_3)_3$ | $B(OCH_3)_3$ | $B(OC_2H_5)_3$ | $B(OC_2H_5)_3$ | $B(OC_2H_5)_3$ |
| Quantity (g.) | 8.65 | 8.65 | 7.3 | 12.2 | 7.3 |
| Moles | 0.0835 | 0.0835 | 0.05 | 0.0835 | 0.05 |
| $B_2O_3$: | | | | | |
| Quantity (g.) | 5.8 | 5.8 | 6.9 | 5.8 | 6.9 |
| Moles | 0.0835 | 0.0835 | 0.1 | 0.0835 | 0.1 |
| Ethyl ether: | | | | | |
| Quantity (g.) | 11.2 | 11.2 | 11.2 | 11.2 | 11.2 |
| Moles | 0.15 | 0.15 | 0.15 | 0.15 | 0.15 |
| Alkyl halide: | | | | | |
| Type | $C_2H_5Br$ | $C_2H_5Cl$ | $C_2H_5Br$ | $C_2H_5Br$ | $C_2H_5Cl$ |
| Quantity (g.) | 81.8 | 48.5 | 81.8 | 81.8 | 48.5 |
| Moles | 0.75 | 0.75 | 0.75 | 0.75 | 0.75 |
| Percent yield as $BR_3$ | 70 | 73 | 72 | 78 | 82 |

From a comparison of these examples it can be seen that the yield of $BR_3$ tends to be influenced by the nature of the alkyl halide and the type of basic ester of boric acid.

EXAMPLE XIII 200 ml. of diethylbenzene, 18 g. (0.75 mole) of metallic magnesium chips and 11.2 g. (0.15 mole) of ethyl ether were placed in a 500 ml. flask equipped with a stirrer, thermometer, reflux condenser, influx pipe for gaseous $BF_3$ and a dropping funnel. Stirring was initiated and the mixture was heated to a temperature of 100–110° C. 81.8 g. of ethyl bromide were slowly dripped into the medium and simultaneously 17 g. of gaseous $BF_3$ were bubbled therethrough.

The addition of these reagents was carried out over a period of about three hours adjusting the addition such that the temperature remained at 100–110° C.

Triethylboron was distilled from the reaction mixture. The yield was 66%.

EXAMPLE XIV

Separate production of Grignard reagent

A comparative test was carried out similar to that described in Example III, but in this instance the reaction was carried out in two steps in the sense that the Grignard's reagent was prepared separately and then the methylborate was reacted with the preformed Grignard.

Thus 18 g. of metallic magnesium chips (0.75 mole) was suspended in 200 ml. of diethylbenzene and 1 ml. of ethyl iodide was added in order to facilitate attack upon the magnesium. 5.6 g. of ethyl ether (0.075 mole) was also added.

The mixture was heated to 100° C. and ethylchloride was then added dropwise over a period of about three hours.

Ethylmagnesium-chloride was obtained with a yield of 22% based on magnesium.

In order to obtain under the same conditions and using the same reactants a yield of 70% as $C_2H_5MgCl$, it was necessary to operate in closed vessel under an elevated pressure of 5 to 6 atm. (gauge). The Grignard derivative was reacted with 26 g. of $B(OCH_3)_3$ and triethylboron was obtained with a yield of 18% while in Example III the yield was 58%.

EXAMPLES XV–XVIII

Operated under the same conditions of Example VII, but with the parameters listed in Table 3, the indicated results were obtained:

TABLE III

| Example | XV | XVI | XVII | XVIII |
|---|---|---|---|---|
| Ethyl borate (g.) | 12.2 | 10.5 | 8.5 | 8.5 |
| Boron oxide (g.) | 5.8 | 6.2 | 6.67 | 6.67 |
| Ethyl ether (g.) | 11.2 | 11.2 | 11.2 | 11.2 |
| RX type: | | | | |
| Type | a$C_6H_5Br$ | $C_4H_9Br$ | b$C_6H_{11}Cl$ | c$C_6H_5CH_2Br$ |
| Grams | 118 | 106 | 89 | 128.5 |
| Temperature (° C.) | 150 | 140 | 140 | 160 |
| $BR_3$-type product | a$C_6H_5$ | $C_4H_9$ | b$C_6H_{11}$ | c$C_6H_5CH_2$ |
| Yield | 65 | 72 | 68 | 67 | a $C_6H_5$=phenyl.
b $C_6H_{11}$=cyclohexyl.
c $C_6H_5CH_2$=benzyl.

We claim:

1. A process for the preparation of triorganoboron compounds with direct carbon-boron bonds and with the general formula $BR_3$, wherein R represents an alkyl, aryl, alkylaryl, or cycloalkyl radical, comprising the steps of reacting an organohalide of the general formula RX, wherein X is chlorine, bromine or iodine and R represents said radical, with at least one boron-containing compound selected from the group which consists of boron trichloride, boron trifluoride, boron-trifluoride adducts with organic compounds containing a highly electronegative atom, alkyl borates, and reaction products of boric oxide with boron halides and alkyl borates in the presence of a reaction medium formed by a suspension of metallic magnesium in an alkyl, aryl, cycloalkyl, cycloaryl, or alkylaryl hydrocarbon solvent and a catalytic quantity of an ether at a temperature and for a period sufficient to result in the formation of the corresponding triorganoboron compound, said ether being present in a molar ratio to said organohalide of a maximum of 0.5; and thereafter separating the triorganoboron compound from the reaction mixture.

2. The process defined in claim 1 wherein said organohalide contains a carbon chain having from 2 to 7 carbon atoms.

3. The process defined in claim 2 wherein said organohalide contains a cyclohexyl, phenyl, benzyl, ethyl or butyl hydrocarbon radical.

4. The process defined in claim 2 wherein said ether is ethyl ether and is present in said suspension in a molar ratio to said organohalide ranging between substantially 0.01 and 0.5.

5. The process defined in claim 4 wherein said suspension is initially heated to a temperature of substantially 80° to 100° C. prior to the addition of said organohalide and of said boron-containing compound to said solution, said suspension during addition of said organohalide and said boron-containing compound thereto being maintained at a temperature between 100° and 120° C. by controlling the rate of addition of the latter compounds thereto.

6. The process defined in claim 1 wherein the reaction is effected at an elevated temperature between substantially 80° and 180° C., said solvent having a boiling point above said temperature.

7. The process defined in claim 6 wherein said solvent is a diethylbenzene.

8. A process as defined in claim 1 wherein said hydrocarbon solvent is an alkyl, aryl, cycloalkyl, cycloaryl or alkylaryl hydrocarbon containing from 6 to 14 atoms.

References Cited

UNITED STATES PATENTS

| | | | |
|---|---|---|---|
| 3,397,241 | 8/1968 | Smai et al. | 260—606.5 |
| 2,862,952 | 12/1958 | Groszos | 260—606.5 X |
| 2,880,243 | 3/1959 | Hennion | 260—606.5 |
| 2,884,441 | 4/1959 | Groszos | 260—606.5 X |
| 2,925,438 | 2/1960 | Brown | 260—606.5 |
| 2,992,267 | 7/1961 | Koster | 260—606.5 X |
| 3,030,406 | 4/1962 | Washburn et al. | 260—606.5 X |
| 3,078,311 | 2/1963 | Brown | 260—606.5 |
| 3,090,801 | 5/1963 | Washburn et al. | 260—606.5 X |

TOBIAS E. LEVOW, Primary Examiner

W. F. W. BELLAMY, Assistant Examiner

U.S. Cl. X.R.

252—432